United States Patent [19]
Wacks

[11] 3,944,357
[45] Mar. 16, 1976

[54] MICROFILM MAKING APPARATUS
[75] Inventor: Harvey H. Wacks, Southfield, Mich.
[73] Assignee: Energy Conversion Devices, Inc., Troy, Mich.
[22] Filed: May 14, 1973
[21] Appl. No.: 359,717

[52] U.S. Cl. .................................. 355/5; 355/14
[51] Int. Cl.² ................................. G03G 15/00
[58] Field of Search ............... 335/5, 14, 3 R, 3 DD

[56] References Cited
UNITED STATES PATENTS

| | | | |
|---|---|---|---|
| 3,051,044 | 8/1962 | McNaney | 355/5 |
| 3,083,623 | 4/1963 | Mott | 355/5 |
| 3,168,857 | 2/1965 | Hutto | 355/5 |
| 3,504,969 | 4/1970 | Martel | 355/5 |

*Primary Examiner*—Richard L. Moses
*Attorney, Agent, or Firm*—Wallenstein, Spangenberg, Hattis & Strampel

[57] ABSTRACT

Apparatus for producing microfilm which, in its preferred form, comprises xerographic reproduction apparatus responsive to printed document reflectable radiation produces on an endless image projection member a removable image opaque to a given radiant energy. Radiant energy is momentarily projected through the member and a high reduction lens system upon a grainless photosensitive microform material. The photosensitive microform material most advantageously comprises an etch-resistant transparent substrate having a film of an etchable metal or metallike image-forming material, in turn, having a film of a photosensitive material which becomes chemically transformed by exposure to said radiant energy to form or leave on the exposed or unexposed areas thereof a material removable or permeable by an etchant which removes the image-forming layer thereneath, and on the other of same a material which is not removed or permeable by the etchant. The etching process, which need take only less than one second, may be followed by an instant wash and hot air blast, to provide a dry microfilm having unusually high acuity, contrast and resolution, and excellent archival properties.

8 Claims, 8 Drawing Figures

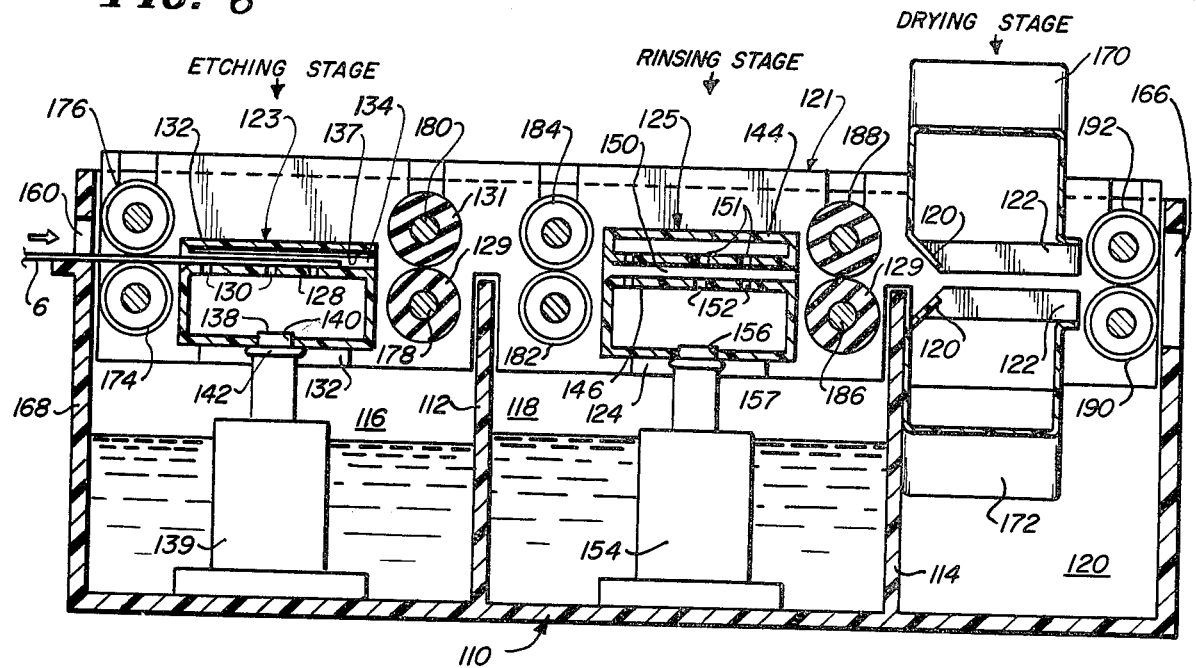

MICROFILM MAKING APPARATUS

BACKGROUND OF THE INVENTION

This invention relates to image reproduction apparatus and has its most important application in the making of original microfilm from light reflecting hard copy (such as printed documents and the like), or from the light patterns produced on the faces of a cathode ray tube used in computer readout systems and the like.

Microform, such as microfilm, heretofore has been produced, in the main, by one of three processes, namely the diazo process, the silver halide process and the vesicular process. All of these microfilm making processes share one, or more, disadvantages, chief among which are relatively long exposure and/or development times, the complexity and/or inconvenience in the materials and equipment required to develop the film and in the poor quality of the enlarged microfilm image produced thereby. The vesicular process has the added disadvantage of very poor latent image stability which requires immediate development after exposure. A recently developed microfilm making process referred to as the dry silver process, is one which requires short exposure time and is developed rapidly by application of heat. However, this process like the other referred to microfilm making processes, has resolution and contrast limitations which usually produce relatively poor quality readable copy when the microfilmed images are enlarged to full size.

The silver halide process uses silver halide films responsive primarily to visible light which reflects readily on light surfaces and is absorbed to a substantial degree by opaque inks. The diazo and vesicular films used in the diazo and vesicular processes are primarily responsive to ultraviolet radiation which does not reflect efficiently, if at all, from the materials used to make printed documents. Moreover, in comparison to silver halide films, which have a very high degree of sensitivity to visible light, diazo and vesicular films have a low degree of photosensitivity, even to ultraviolet radiation.

The most widely used process for producing original microfilm of a printed document uses a camera to take a picture of the visible light reflected from the document upon silver halide film through a microfilm reducing lens which produces about a 24 to 1 or greater image reduction on the silver halide film. Since only a small percentage of the initially projected visible light is actually directed after reflection to the lens, only a highly photosensitive material like silver halide was thought to be practical for making original microfilm from printed documents. However, the images obtained on silver halide microfilm have low contrast and poor edge definition and resolution due to the granular character of the silver halide emulsions and the film must be processed with special chemicals to impart archival properties to the finished product. Moreover, development of silver halide film requires the typical complex and time consuming developing process well-known in the art. This complexity of the developing process and the equipment used and the skilled personnel who operate the same are such that development is usually done by special film processing companies. Thus, the silver halide film development process requires of the order of at least tens of seconds to carry out development of the exposed film material and employs short-lived developing chemicals, which are unpredictable, and which due to surface phenomena, are absorbed and absorb on the surface of the film substrate to an extent such that drying of the developed sheet material is difficult. The nature of the process, therefore, requires a skilled operator to carry it out.

Microfilm copies are generally made by making contact copies of the original microfilm upon less expensive diazo or vesicular film. The low contrast and poor edge definition of the original silver halide film is transferred to the diazo or vesicular microfilm copies which are generally of comparably less or inferior quality as compared to the original microfilm. Upon enlargement of the microfilm image in a microfilm reader or the like, the poor contrast and edge acuity of the original microfilm produce marginally acceptable enlarged microfilm images. As previously indicated, while the dry silver process film would greatly reduce the complexity of the developing procedure, the contrast and resolution deficiencies referred to would also be present, and where microfilm copies are to be made therefrom would involve a higher film cost than diazo and vesicular films.

To expand further on the deficiencies of the heretofore commonly used diazo and vesicular microfilm copying processes, the following additional facts should be kept in mind. The diazo microfilm copying process, which is perhaps the most widely used process, is based on the formation of a dye as a result of the reaction of a diazo compound with its decomposition product or with a coupling component. While basically a low cost process, the diazo process has a number of important disadvantages, including the necessity, generally, for utilizing aqueous or gaseous ammonia as the developer for the exposed sheet material. Apart from its obnoxious properties, the use of aqueous or gaseous ammonia in the process requires special equipment to insure uniform distribution of ammonia vapor in the developing chamber, and to prevent the accumulation of any condensed ammonia vapors therein. Precautions, also, must be taken to prevent escape of ammonia vapors in the work area. Even then, ammonia vapors are invariably sensed in the work area. Over and above the foregoing considerations, the process requires expensive machinery with long path lengths to carry out development of the exposed sheet material, and, in addition, requires development times of the order of at least tens of seconds. Apart from these shortcomings, images produced by the diazo process have low contrast, a severe limitation especially in microfilm where, due to the requirement for considerable enlargement in readout, the highest possible contrast is needed. Furthermore, images produced by the diazo process tend to fade when exposed to light, and, therefore, are not permanent.

The vesicular developing process, also, is a complex process. Thus, for example, the vesicular film is first given an overall pre-exposure sensitization. This is followed by an image-wise exposure and heating which, because of the poor latent image stability of vesicular film materials must be developed in a matter of seconds after exposure. Finally, a post-exposure fix is required. Development of the exposed sheet material requires temperatures in the range of 120° C to 140° C to bring about expansion of nitrogen gas released by a diazo component during exposure of the sheet material. Due to the relatively high development temperatures employed, vesicular films require the use of more costly, heat stable substrates. Heat also acts to erase the image and, therefore, suitable procautions must be taken to protect the developed film from heat during storage and use, a factor which detracts from the archival qualities of the film. Images obtained by the process have inferior edge acuity, limited resolution and relatively low contrast, and a contrast which is dependent upon the aperture system used.

It is well known that the poor quality of the image produced on microfilm reading equipment has made it an uncomfortable and laborious process to obtain information in this manner. Also, the aforementioned difficulties in the processing of the various exposed microfilm materials heretofore commercially utilized have been at least partly responsible for the absence of office microfilm making equipment which develops as well as exposes the microfilm in a manner which permits the operation thereof by unskilled personnel, so that enlarged projected copies of microfilmed records becomes immediately available shortly after exposure of the microfilm thereto. While diazo and vesicular films have some cost and processing advantages over silver halide films, they have not been used to make original microfilms, as previously indicated because of the fact that they cannot effectively respond to reflected visible or invisible light from printed documents. Additionally, they have such poor photosensitivity even to ultraviolet light that they have not been seriously considered for making microforms where high recording rates become desirable.

Accordingly, a main object of the invention is to provide a unique microform producing apparatus and a method of making original microform of printed documents or cathode ray tube traces directly on relatively poorly photosensitive materials providing images of high resolution and excellent edge definition.

Another object of the invention is to provide a microform producing apparatus as described which is for office or laboratory use by unskilled office personnel to make completely processed microform reductions, especially microfilm reductions, of printed documents or cathode ray tube trace images without the necessity for outside processing of the film. A related object of the invention is to provide an apparatus and method as just described where exposure and processing rates are so rapid that the interval between successive exposures can be substantially under ten seconds and the processing of each exposed frame thereof takes at most a few seconds.

Another object of the invention is to provide an apparatus and method of making original microfilm of printed documents or cathode ray tube traces which apparatus and method utilize relatively inexpensive films (i.e. film containing no precious metals like silver and the like), which film utilizes materials which normally require long exposure times to convert the same to film transparencies which fabricated in the usual way, but are utilized in a unique manner where they produce microform images with exposure times of at most a few seconds.

Another object of the invention is to provide an apparatus and method as above described where the contrast, resolution and acuity of the microfilm produced thereby is so much improved over the microfilm heretofore made that microform recorded images can be easily read on microfilm readers.

A further object of the invention is to provide an apparatus and method as above described which makes maximum use of already developed reproduction equipment.

A still further object of the invention is to provide apparatus as described which can be manufactured to sell or lease at a reasonable cost, is reliable in operation and can be serviced and maintained at a reasonable cost.

SUMMARY OF THE INVENTION

In accordance with one of the aspects of the invention, original microform, particularly microfilm, of printed documents is obtained by camera-forming apparatus which includes or uses a grainless microfilm structure substantially insensitive to the radiant energy which significantly differentially reflects off of the light and dark areas of printed documents. The camera-forming apparatus most advantageously utilizes xerographic reproduction means to produce from light reflected from printed documents or light from cathode ray tube traces or the like an image thereof on an image projection member having a pattern of areas respectively relatively transparent and opaque to radiant energy to which the microform structure is responsive. The image projection member is preferably a transparent endless web or belt upon which is formed a removable opaque deposit of triboelectric or toner material which can be reused after each exposure. A source of radiant energy to which the microfilm structure is sensitive is positioned on one side of the image projection member. Holding means is provided for supporting the microform structure in spaced relation to the other side of the image projection member, and a reduction lens is positioned between the image projection member and the microform structure holding means for focussing on the microform structure a substantially reduced image of the image projected through the image projection member.

To satisfy the objective of providing original printed document microfilm making apparatus for office use by unskilled personnel and where the intervals between successive exposures can be made in substantially under ten seconds places very stringent demands on the various components of the system. An important factor present in the most advantageous form of the present invention which decreases the required exposure time to a practical value for office or laboratory use thereof and enables the instant and convenient development of the microfilm by unskilled personnel involved or automatically by the equipment involved is the use of a new microform material in which the photosensitive materials therein are used in a different manner from that which these materials were heretofore commercially utilized for this purpose. Thus, in accordance with this most advantageous form of the invention, the photosensitive material in the microform structure is utilized only as a latent image receiving means to provide a pattern on one of the exposed or unexposed areas thereof which is removable or permeable by an etchant, the other of same being resistant to such etchant. The opacity of this microform structure is obtained by providing beneath the photosensitive material an etchable image-forming layer of opaque material which produces a very high contrast with those portions of the processed film which are devoid of the etchable image-forming material. The photosensitive material and the image-forming layer may be both applied as films upon a transparent flexible substrate which is not affected by the etchants involved.

When the etchant material is applied to the exposed microform film structure described, the etchant dissolves away or permeates the exposed or unexposed portions of the photosensitive material, to gain access to the image-forming layer therebeneath. The opacity of the microform structure just described is thus not dependent upon the conversion of the exposed portions of the film to a highly transparent or opaque state, as is the case with the previously used photosensitive microfilm materials. Rather, the opacity of the microform structure described is determined solely by the opacity of the image-forming layer thereof, and the amount of radiant energy needed to form the image is merely that necessary to convert the photosensitive material to one which is either soluble, permeable or resistant to the etchant utilized to a substantially different degree from that of the unexposed portions thereof. This amount of light is 1/10 or less than the amount of radiant energy necessary to form an image of acceptable contrast using the inexpensive microfilm duplicating materials referred to. Etchant responsive microform structures of the type described are disclosed in copending application Ser. No. 205,806, filed Dec. 8, 1971.

It has been heretofore proposed to combine xerographic reproduction apparatus with a radiant energy projection system making a full size print of the xerographic image on a printing paper directly contacting a transparent drum or belt surface on which the xerographic image was initially deposited. In one form of this equipment (see U.S. Pat. No. 3,504,969) the xerography drum or belt surrounded all of the xerographic equipment which deposited the toner particles on the inside of the drum or belt. Radiant energy was projected through the drum or belt surface to expose the printing paper. However, it was not believed such a system was ever considered to make microfilm where the intervals between successive exposure times are to be short relative to the time needed to properly expose the microfilm materials. Thus, to produce an image using presently available radiation sources projecting radiant energy through a full size xerographically formed image-forming deposit on a transparent drum or belt surface against which a conventional photosensitive microfilm structure is pressed probably requires exposure times of one or more minutes, which would be impractical in original microfilm making equipment where short exposure times are a practical necessity. Also, the aforesaid prior reproduction systems disclosed in the U.S. Pat. No. 3,504,969 requires that the radiation energy pass through a xerography drum or belt which uses selenium or other materials which would absorb significant amounts of the radiant energy, further increasing the exposure times needed to produce a good image. The system also is of questionable practicality because of drum wearing and servicing problems inherent therein.

The etchant responsive microform structures most advantageously used in the present invention are characterized by having a higher contrast than is now obtainable with conventional microform materials. It is further characterized by having outstanding edge acuity and resolution which, in certain instances, enables an increase in sharpness and resolution to be attained exceeding even that of the original. In addition, microform produced from these etchant responsive microfilm structures, without post-development processing of any kind, has archival properties which are superior to those of microform produced from conventional materials. Further, in this latter connection, microform produced from these microform structures is not adversely affected by either extreme changes in temperature or humidity, and is resistant to fungal and bacterial attack. They are further characterized in that they can be developed in a fraction of the time required for other microform materials. This characteristic thereof, coupled with its ability to be processed instantly (in a matter of seconds or less) after exposure, in an unobnoxious, non-volatile aqueous system makes these microform structures especially adaptable for high-speed, continuous, mass production of microform in the combined xerographic image reduction system of the invention, which can be conveniently and economically used by unskilled office personnel. The finished product, apart from the outstanding characteristics noted above, has multiple generation capabilities unmatched by films produced by prior processes. More specifically in this connection, up to ten generations have been produced with films of this invention without any noticeable image degradation. This is in sharp contrast to films produced by the silver halide process where upwards of a 20 percent loss in resolution and contrast per generation is experienced or, in the case of films produced by the diazo and vesicular processes, where upwards of a 10 percent loss in resolution and contrast per generation is observed.

The development of the microform after exposure can be accomplished in a number of ways. As perhaps is most convenient in the case of making microfilm reductions of the order of magnitude of 20 to 1 or less, the film need not be processed until an entire roll of such film has been exposed. Then the user thereof by automatic means or manually threads the roll of film through a processing unit which is operated rapidly to develop the roll of film. In the case of the etchant responsive film described, the processing unit may spray an etchant on the film which, almost instantly, etches away the image-forming layer thereof and then washes and dries the film, the processing of each exposed frame taking only a few seconds. The development of the exposed image on the etchant responsive film can also be achieved in the few second interval between successive exposures thereof by any automatic means which brings in quick succession adjacent the just exposed portion of the film an etchant source which sprays the etchant thereon while the adjacent area of the film is isolated by a suitable masking means, a wash material source which sprays water or other washing liquid thereon, and a source of hot air to dry the treated portion of the film. In this form of the invention, after each exposure, that portion of the microfilm just exposed is thus available for examination by projection or otherwise.

The equipment of the invention can be designed to make microfiche cards directly, in which case the film could be fed through the microfilm producing machine on microfiche cards and exposed and developed in the manner previously described. In such case, the machine would include suitable card indexing means so successive exposures are properly placed on the card.

The aforementioned etchant-responsive microform structures most preferably used in the present invention offer the advantage that either the exposed or unexposed portions of the photosensitive material therein can be the etchable portion thereof. Thus, where the microform structures are in rolls or are microfiche cards where a given exposure affects only a single frame thereof, if the microform structure is of the type where only the exposed portions are etchable, the processing of an entire microform roll or microfiche card would not effect the photosensitive layer in the unused portions of the film, which means that the microform structure has information add-on capabilities in the areas thereof which are not unexposed. Thus, a particular roll of microfilm or a particular microfiche card can be assigned a particular classification to which information may be repeatedly added at various times following prior processing thereof. In such case, the apparatus of the present invention includes a microfilm or microfiche card to be manually indexed to a particular position to be exposed by the apparatus. This receives a visible light projection station at which a source of visible light is projected through or against the frame of the roll of microfilm or microfiche card in position next to be exposed to the radiation energy involved, which would here be invisible light, such as ultraviolet light. (The various exemplary microform structures described in said copending application Ser. No. 205,806 are all sensitive to ultraviolet light and substantially insensitive to visible nonblue light, making such a projection station feasible if a filter is used to filter out any blue light from the source of visible light used to project the frame involved into a viewing window provided for the operator.)

While the most important and advantageous aspect of the invention is the utilization of a combined xerographic reproduction and xerographic image projection system wherein the projected xerographic image is reduced by the order of at least about 20 to 1 and projected on an etchant responsive microfilm as described, in accordance with the broader aspect of the invention, such a system may be utilized with projected xerographic images reduced by the order of magnitude of as little as 4 or 5 to 1, for example, to make microforms for lithography drum projection applications or the like. Also, the broader aspects of the invention encompass a combined xerographic reproduction and xerographic image projection system wherein the projected xerographic images are projected on a microform structure other than the etchant type microfilm described. While the latter system is yet a substantial improvement over the prior art microform making systems, it suffers from some of the serious problems of the prior art as above described. However, there are applications which can tolerate some of these problems, provided at least one or more of the advantages of the invention described are present.

The above and other objects, advantages and features of the invention will become apparent upon making reference to the specification to follow, the claims and the drawings.

DESCRIPTION OF THE DRAWINGS

FIG. 6 is a sectional view through an exemplary film processing unit which may be used in the embodiment of the invention shown in FIG. 1;

FIG. 7 is a fragmentary view of a modified form of an original microform producing system like that shown in FIG. 1, except that the film processing apparatus has been modified to one where film processing takes place on a frame by frame basis immediately after each exposure of a portion of the microform; and FIG. 8 is a plan view of the film processing apparatus shown in FIG. 7.

DESCRIPTION OF PREFERRED EMBODIMENTS

Figure 1:
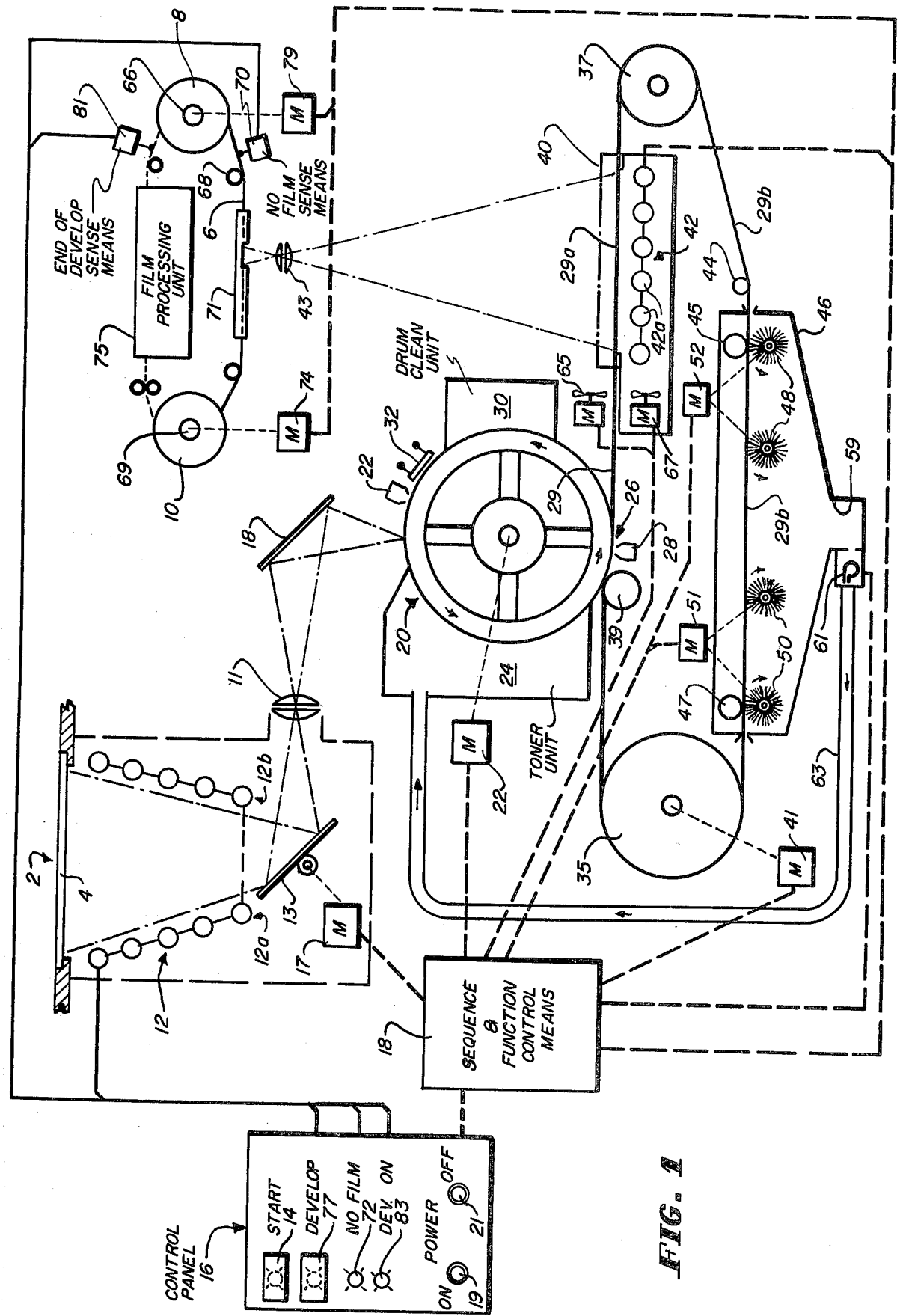
FIG. 1 illustrates a preferred embodiment of an original microfilm producing system incorporating the features of the present invention.

Refer now to FIG. 1 which shows therein an original microfilm producing system incorporation the features of the present invention. This system has an information input station 2 at which a printed document is placed upon, or light from the trace of a cathode ray tube, enters the system. When the original microfilm producing system is to be used to make copies of printed documents, this input station includes a window-forming plate 4 or the like which forms a support surface upon which a printed document may be placed. Reflected light from the document placed upon the window-forming plate 4, or other information-carrying light passing through the plate 4, is utilized to produce xerographically preferably a full size or larger image of the printed document which, in the manner to be described, is converted to an image of reduced size directed upon a grainless photosensitive microform structure 6 which is relatively insensitive to printed document reflected light. As illustrated, the microform structure 6 is in the form of a roll of microfilm extending between a supply reel 8 and a take-up reel 10. While the xerographic apparatus utilized to form a xerographic image from the light passing through the window-forming plate 4 may take a variety of forms, it is most advantageous xerographic equipment arranged in the manner shown in FIG. 1 to be described.

As previously indicated, while the conventional method of making original microfilm is to take a direct picture of the document or the like through a reducing lens upon a light sensitive silver containing film, the present invention uniquely produces original microfilm on a grainless photosensitive film utilizing xerographic means for providing a xerographpic image which in turn is converted to a radiation projected image substantially reduced in size upon the microform structure. Where the information fed into the apparatus of the invention is contained on a printed document placed upon the window-forming plate 4, as is well known, it is necessary to flood the printed side of the document placed face down upon the plate 4 with a very large amount of light which reflects from the light areas of the document, since the useful light reflected from the printed document is a very small percentage of the light impinging thereon. To this end, a source of high intensity visible light is provided below the plate 4, which light source may take the form either of a moving light source or, as illustrated, lamp banks 12a and 12b which direct light through the plate 4 upon the printed document. As is conventional in xerographic equipment, the reflected light is shown as being received upon a pivotable scanning mirror 13 which oscillates back and forth to scan narrow segments of the field of light reflected from the printed document (or directed from the face of a cathode ray tube or the like directing light through the window-forming plate 4). The lamp banks 12a–12b are normally de-energized, and are rendered energized for a short instant following the depression of a "START" pushbutton 14 mounted on a control panel 16. The mirror 13 is oscillated by any suitable motion imparting means 17 controlled by a sequence and function control means 18, whose operation is initiated by depression of the "START" pushbutton 14. The control panel 16 has "ON" pushbutton 19 for energizing the sequence and function control means 18 and other portions of the system which are energized in a conventional xerography machine. and an "OFF" pushbutton 21 which de-energizes sequence and function control means 18 and other portions of the machine in a conventional manner found in xerography equipment. The sequence and function control means 18 may take a variety of forms, and may consist of the type of operation sequence control means commonly found in commercially available xerography equipment and the like. The motion imparting means 17 imparts a pivotal movement in one direction to the mirror 13 while the lamp banks 12a–12b are energized and returns the mirror to its initial position after the lamp banks 12a–12b have been de-energized.

The original microfilm producing system illustrated is designed to be used by unskilled personnel in an office, laboratory or the like, where it is desired to copy printed records (or the changing pattern of traces on the face of a cathode ray tube) at relatively rapid rates, so that successive microfilm frames are made in a matter of seconds between successive exposures. Such feeding rates are now common with commercially available xerographic equipment. High speed xerographic equipment utilizes stationary lamp banks like 12a–12b to reduce the time between successive exposures from that generally required where a moving light source is provided. However, a moving light source could be utilized where additional speed afforded by the stationary lamp banks is not needed, because of time limitations caused by slower operating portions of the machine, such as the time needed to make exposures of the microfilm 6. However, an important aspect of the most advantageous form of the invention is the design of the original microfilm producing system so that minimum exposure times are required to provide clear images upon the microfilm 6.

As illustrated, the resulting image reflected from the mirror 13 passes through a suitable lens 16 and a reflecting mirror 18 which directs the image, which is illustrated as full size, upon a momentarily moving xerography drum 20 so that the image scanned by the mirror 13 is transferred upon the xerography drum 20. The xerography drum 20 is rotated by suitable motion imparting means 22, in turn controlled by the sequence and function control means 18.

The xerography drum 20 is most advantageously a conventional amorphous selenium covered drum which, at a point in advance of the point where the drum receives the reflected image from the mirror 18, is charged by suitable charging means 22. As is well known, the areas of the drum which are struck by the visible light are discharged to form a xerographic image upon the drum. During each exposure cycle, the drum 20 moves the area of the drum which has been exposed to a toner unit 24, at which triboelectric particles are transferred to the drum surface where they adhere to the still charged regions thereof. The toner-carrying portions of the drum are then moved to an image transfer station 26 where the triboelectric particles involved are transferred upon a transparent belt 29 (sometimes referred to as an image receiving member) by the action of a belt charging unit 28 (which is conventionally found in xerographic equipment to effect the transfer of triboelectric particles from the drum upon the xerography paper to which the triboelectric particles are commonly transferred in such equipment). It should be understood that a practical variant of the xerographic equipment illustrated is to provide means to transfer the charge on the drum 20 to the endless belt 29, where a toner unit would operate on the belt 29 rather than upon the drum 20.

Following the transfer of the triboelectric particles to the transparent belt 29 during each exposure cycle initiated by depression of the "START" pushbutton 14, a portion of the drum 20 is moved past a drum cleaning unit 30 which cleans the surface of the drum in a conventional way. The belt 29 may be made of such materials as polyethylene terphale or cellulose acetate. During each exposure cycle, a portion of the drum is moved past a suitable drum discharging lamp 32 or the like, which discharges the drum in advance of the point where the drum charging means 22 recharges the drum. At some point after the transfer of the triboelectric particles to the belt 29, the movement of the drum terminates until the beginning of a new exposure cycle, initiated by the subsequent depression of the "START" pushbutton.

The transparent belt 29 is an endless belt most advantageously moved in a horizontally elongated path where the endless belt passes around a pair of end rollers or sprockets 35–37. Intermediate rollers 39, 44, 45 and 47 are provided to support and guide the belt. The belt 29 is shown as including an upper horizontally oriented section 29a and a bottom horizontally oriented section 29b. During each exposure cycle, the belt is moved in a direction where the upper section 29a of the belt moves to the right viewed in FIG. 1 where the triboelectric particle containing section thereof is moved to a projection station 40. The belt 29 is moved only a distance necessary to bring the triboelectric carrying portion of the belt to the projection station 40. The end roller or sprocket 35 is shown controlled by motion imparting means 41, in turn controlled by the sequence and function control means 18 which controls the movement of the belt 29. The precise positioning of the image carrying portion of the belt 29 can be controlled in any suitable way. The belt may carry position indicating means which are sensed by photocells or the like to stop the belt at the proper position, or the belt may include perforations or other indexing means with which projections on the sprocket or roller 35 make engagement so that, by precisely controlling the angular rotation of the sprocket or roller 35, close control over the advancement of the belt 29 can be achieved.

The bottom section 29b of the belt may then be moved through a belt cleaning unit 46 in which the triboelectric particles adhered to the bottom face of the belt 29 are removed by brushes 48 and 50 controlled by motion imparting means 52 and 54, in turn controlled by the sequence and function control means 18. The brushes 48 and 50 are preferably operating only during the movement of the belt 29. The bottom wall of the belt cleaning unit 26 is inclined downwardly towards the center thereof to form a hopper, so that the triboelectric particles removed from the bottom face of the bottom section 29b of the belt 29 will fall into a central outlet orifice 59, where vacuum producing means 61 will force the triboelectric particles through a return conduit 61 to the toner unit 24, so that the toner particles are recirculated and reused.

At the projection station 40 there is provided a source 42 of radiant energy to which the microform structure 6 is sensitive, preferably radiant energy rich in ultraviolet light. The radiant energy source 42 is most advantageously positioned within the confines of the belt 29, so as to direct the radiant energy through the still transparent portions of the belt 29. The triboelectric particles will absorb this radiant energy, thereby creating a positive image of those areas of the original printed document having a white or light color. The source 42 of radiant energy is illustrated as being a bank of ultraviolet light producing lamps 42a, which like the visible light generating lamps 12a–12b, are under control of the sequence and function control means 18, so these lamps are momentarily energized at the appropriate time in the exposure cycle as previously described.

The period of time necessary to provide an effective exposure image on the microfilm 6 is dependent upon a number of factors. In the first place, this exposure time depends upon the intensity of the radiant energy generated by the lamp banks 42a. While a single lamp could be utilized which is progressively moved beneath the belt 29 at the projection station 40, to reduce exposure time the stationary bank of lamps 42a is preferably used which simultaneously exposes all image carrying portions of the belt 29 at the projection station 40 to the desired radiation intensity. To maximize the permissible intensity of the lamp bank 42a, the upper and bottom surfaces of the belt 29 at the invisible light projection station 40 are most advantageously cooled by air blowers 66 and 67 which may be continuously energized while power is on, or intermittently energized through control of the sequence and function control means 18.

The radiant energy projected through the belt 29 passes through a reducing lens 43 which focuses the radiant energy projected xerographic image upon the microfilm structure 6. The lens 43 preferably provides for image reductions of at least the order of magnitude of 20 to 1.

While the transparent belt 29 could be eliminated by making the xerography drum 20 transparent to the radiant energy, and moving the radiant energy projection station 40 to a point along such a transparent drum, this arrangement would be extremely impractical and expensive. For example, the drum as a practical matter would have to be much larger (and therefore more expensive) to accommodate the various instrumentalities cooperating with the belt 29 previously, such as the blowers 66, 68, the belt cleaning unit 26, the projection station 40, etc., in addition to the various xerographic components associated with the drum 20 as above described. Also, the most efficient commercially available xerographic drums using selenium could not be effectively used because selenium is substantially opaque to radiant energy like ultraviolet light.

The use of an endless belt separate from the photosensitive xerography drum also permits the ready relatively inexpensive replacement of a worn belt.

As illustrated, the microfilm 6 is in roll form on the supply and take-up reels 8 and 10. The supply reel is mounted on a shaft 66 and, as the microfilm unwinds from the supply reel 8, it passes around a guide roller 68 through a film holding unit 71 which establishes a fixed plane for the portion of the microfilm to be exposed. The unwound portion of the microfilm winds upon the aforementioned take-up reel 10 mounted on a shaft 69. Film sensing means 70, which may be a photocell operative device, or, as illustrated, a microswitch positioned in advance of the film holder 71, senses the passage of the film into the film holder 71. The film sensing means 70 is connected in an electrical circuit extending to the control pane 16 upon which is mounted a red lamp 72 which becomes energized when the film leaves the film sensing means 70.

As part of each film exposure cycle following the depression of the "START" pushbutton 14 and following the momentary energization of the invisible light projecting lamps 42a, motion imparting means 74 coupled to the take-up reel shaft 68 is momentarily operated to effect the advancement of the roll of film one frame length, to bring an unexposed portion of the microfilm 6 into position opposite the lens 43. Accordingly, the motion imparting means 74 is connected to the sequence and function control means 18 for control thereby.

After a complete roll of the film has been exposed, the user threads the film on the take-up reel 10 through a film processing unit 75 and back upon the supply reel 8. Depression of a pushbutton 77 on the control panel 16 effects the continuous energization of motion imparting means 79 coupled to the supply reel shaft 8, so the reel is rotated in a direction to pull the roll of film through the film processing unit 75. The microfilm 6 is so insensitive to visible light that the film may be handled in ordinary room light without being affected thereby, so the user may readily expose the film to daylight in the process of inserting the same into the film processing unit 75. Completion of the development of the microfilm 6 is sensed by the provision of an end of develop sensing means 81, which may be a photocell sensing means, or, as illustrated, a microswitch 81 which bears against the portion of the film leaving the film processing unit 75. The pressure of the film on the microswitch 81 affects the energization of a red colored lamp 83 or the like mounted on the control panel 16, to inform the user that the developing process is taking place. As soon as the end of the film passes by the sensing means 81, the lamp 83 will become extinguished.

As previously indicated, the microfilm 6, instead of being in roll form could be mounted on a microfiche card or the like, in which event successive exposures of frames on the microfilm mounted on the microfiche card must be properly indexed by automatic indexing means to effect the exposure thereof at the proper location. If the roll of microfilm can be completely processed in a few seconds as in the case with the microfilm structure to be described, the processing unit 75 may be positioned between the point the microfilm receives the radiant energy involved and the take-up reel 10, as will be described in connection with the embodiment of the invention shown in FIGS. 7 and 8. (While the processing unit 75 is shown as being an integral part of the apparatus illustrated, it could less desirably be completely separate therefrom.)

In accordance with the broadest aspect of the invention, the microfilm 6 used can take a variety of forms such as the well known vesicular or diazo films. However, to obtain a substantial reduction in exposure time of the microfilm, to obtain greatly improved image quality, and to enable the film processing unit 75 to be most practical and fast acting, the aforementioned etchant responsive film is most advantageously used as the film upon which the invisible light image is directed.

Figure 2:
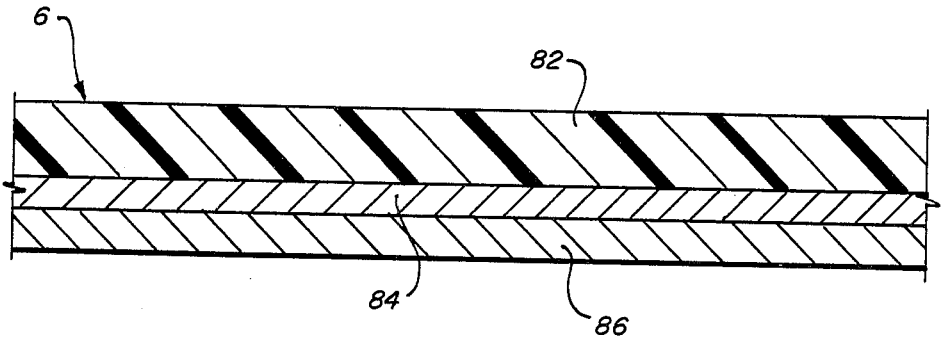
FIG. 2 is a greatly enlarged transverse sectional view of the most advantageous form of microfilm structure utilized in the microfilm producing system shown in FIG. 1.
Figure 3:
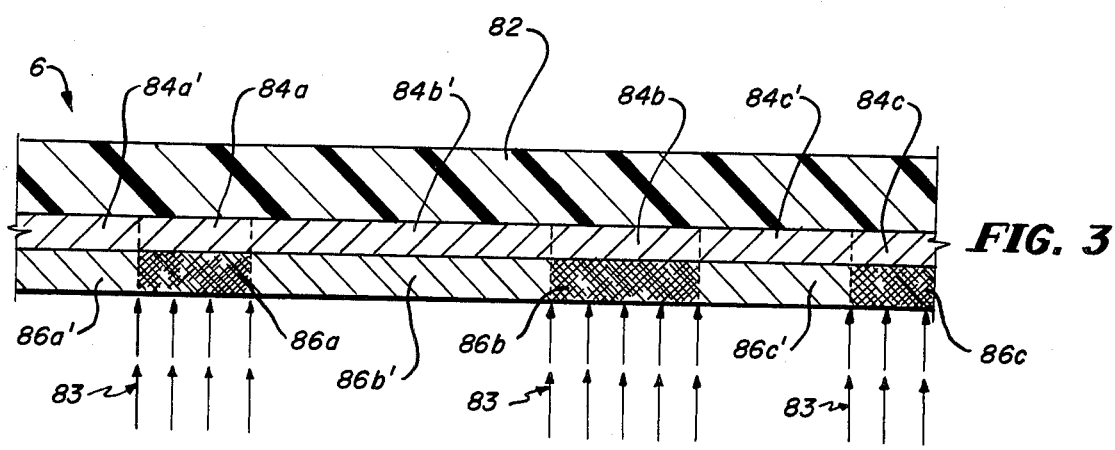
FIG. 3 is a view illustrating the conversion of the microfilm structure shown in FIG. 2 by the exposure of selected portions thereof to the radiant energy illustrated.
Figure 4:
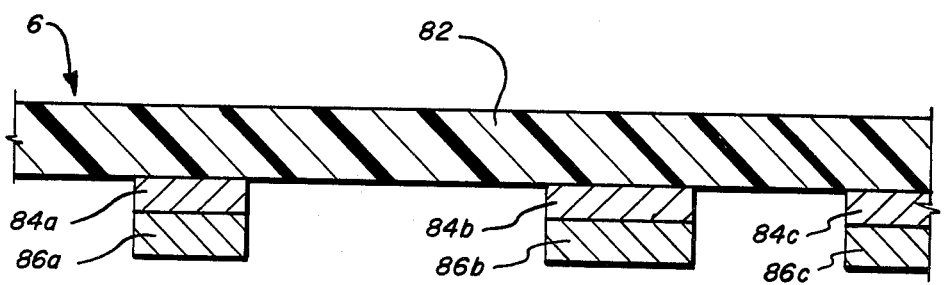
FIG. 4 illustrates that the microfilm structure shown in FIG. 3 after the microfilm structure has been processed by the processing unit shown in FIG. 1.

For a complete explanation of the nature of the most advantageous film 6 useful with the equipment shown in FIG. 1, reference should be made to FIGS. 2–4. This most advantageous microfilm 6 comprises a transparent substrate 82 having deposited thereon a film or layer 84 of an image forming material. On layer 84 is disposed a film or layer 86 of a photosensitive material preferably sensitive primarily to ultraviolet light. FIG. 3 illustrates the radiant energy rays 83 passing through the uncoated portions of the transparent belt 29 to exposed areas 86a, 86b and 86c of the photosensitive layer. In the areas 86a, 86b and 86c, the photosensitive layer 86 which was originally soluble in a given solvent, under the effect of the radiant energy becomes insoluble in said solvent. In this illustration, the photosensitive layer 86 is a negative working material. In the areas 86a', 86b' and 86c' which have not been exposed to the radiant energy 83, the photosensitive layer 86 remains soluble. When the microfilm 6 is treated with a solvent in which the photosensitive layer and the image-forming layer are both soluble, the photosensitive layer 86 in areas 86a', 86b' and 86c' dissolve as does the image forming material in the areas 84a', 84b' and 84c' underlying areas 86a', 86b' and 86c'. The photosensitive layer 86 in areas 86a, 86b and 86c which have become, as a result of the irradation, insoluble, is not dissolved. Also, the image forming layer in areas 84a, 84b, and 84c underlying areas 86a, 86b and 86c is not dissolved. Accordingly, an image is formed by the opaque image forming layer 84 in the areas 84a', 84b' and 84c' where the photosensitive layer and the image forming layer have been removed down to the transparent substrate 82.

The image forming materials for the layer 84 useful in the fabrication of the microfilm structure can be selected from a wide group. Generally speaking, the image forming material utilized can be any metal, or a metal-like material, or any inorganic, organic or metallo-organic or elemento-organic material, having image forming characteristics, which is capable, among other things, of being formed into a thin film or layer, which has a relatively high optical density at minimal thickness, and which is capable of being easily or readily dissolved in an unobnoxious aqueous solvent capable of dissolving, or permeating, those portions of the film or layer of the energy sensitive material which have the greater solubility, or permeability, after the structure has been subjected to energy. The image forming material, further should be compatible with the photosensitive material and be capable of adhering to the substrate of the microfilm structure. In addition, the image forming material should not form reaction products which would inhibit its dissolution during development after exposure. Further, in accordance with the preferred embodiment of the microfilm structure, the image forming material should be hydrophobic so as not to enable a water layer to form thereon which may affect the integrity of the film or layer of the image forming material. While the foregoing desiderate are satisfied to a greater or lesser extent by various image forming materials, including metals such as molybdenum, polonium cobalt, zinc, aluminum, copper, nickel, iron, tin, vanadium, germanium, silver and silver emulsions, they are satisied to the greatest extent by metallike materials such as tellurium and tellurium containing compositions. Generally, in those instances where a tellurium containing composition is used, the tellurium should constitute at least 50 percent of the composition, though, sometimes materials which contain less than 50 percent tellurium can be employed. Suitable tellurium materials can be found among the tellurium containing member materials described, for instance, in U.S. Pat. No. 3,271,591 issued on Sept. 6, 1966 to S. R. Ovshinsky and U.S. Pat. No. 3,530,441 issued on Sept. 22, 1970 to S. R. Ovshinsky. These tellurium materials include the glassy compositions which contain, besides a major proportion of tellurium, one or more elements provided these other elements do not form a salt, or the like, with the tellurium.

Figure 5:
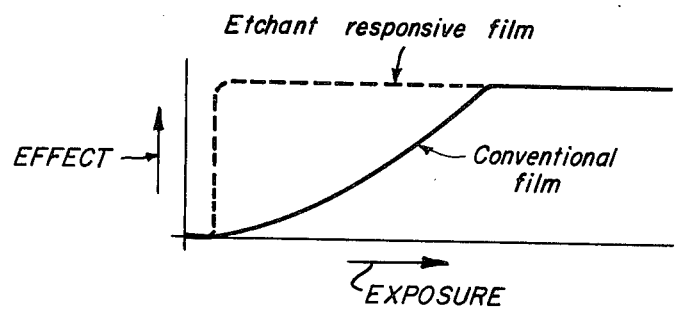
FIG. 5 is a graph showing the comparison of the effect of exposures of conventional microfilm materials with the microfilm structure shown in FIGS. 2–4, the dashed line curve representing the response of the latter microfilm structure and the solid line curve representing the response of the prior art microfilm made with the same light sensitive materials.

One of the significant advantages of the preferred microfilm structure is that only very thin films or layers of image forming material and photosensitive material are required which film need only be a small fraction of the radiant energy to produce the desired chemical effect than similar materials used in conventional microform films. This is due, in the main, to the fact that the useful image formed on the structure after exposure and development is the metal-like film or layer of the image forming material. FIG. 5 illustrates this advantage where the dashed curve shows that only about 1/10 of the exposure is needed to produce the desired affect (contrast) than the same much thicker microfilm photosensitive films used on conventional microform films exemplified by the solid lines. Therefore, since the image forming material need not be energy sensitive, the most important consideration, apart from the aforestated solubility characteristics, in the selection of the image forming material is that it has sufficiently high opacity to provide the high contrast which characterizes the finished products of this invention. Generally speaking, depending upon the opacity of the image forming material, the desired high contrast can be attained with film or layer thicknesses of the image forming material in the range of about 50 to about 5000 Angstroms, usually from about 1000 to about 2000 Angstroms. In those instances where tellurium or a tellurium containg composition, comprises the image forming material film or layer, the generally optimum objectives of the preferred microfilm structure are attained with film or layer thicknesses ranging from about 200 to about 4000 Angstroms, especially desirably from about 1000 to about 1500 Angstroms, with a thickness of about 1200 Angstroms being preferred. The economic importance of the extremely thin film or layer thickness employed in the preferred microfilm structure becomes manifest when considered in relation to silver halide films, for example. Film thicknesses used on such films generally range from 5 to 10 microns. The necessity for using silver halide layers of this thickness, coupled with the depletion of silver metal reserves and the concomitant rise in the price of the metal, point up the cost advantages attainable with this preferred microfilm structure.

The image forming material film or layer is further characterized in that it has an optical density in the aforementioned thicknesses of from about 0.5 to about 5, usually from about 2 to about 3. The image forming material may be deposited on a substrate by any of various standard practices. Thus, for example, in those instances where the image forming material comprises a metal, or a metal-like material such as tellurium or a tellurium containing composition, vapor deposition, vacuum deposition or sputtering techniques can be employed.

As stated hereinabove, since the useful image formed on the preferred microfilm structure after exposure and development is not that of the film or layer of the energy sensitive material, but of the film or layer of the image forming material, it is not necessary that the photosensitive material employed in the manufacture of the preferred microfilm structure have any opacity or image forming properties. From this it is clear that the photosensitive materials having utility in the practice of the present invention can be selected from a wide group, including many energy sensitive materials which heretofore could not be used for imaging purposes because they lack sufficient differential between exposed and unexposed areas to form a visually detectable image of satisfactory contrast. The primary consideration in the selection of the photosensitive material is its ability to undergo a change in solubility or permeability upon the application of the radiant energy involved. The photosensitive material may be soluble in the form in which is is applied, becoming substantially insoluble, or less soluble, or impermeable, after the application of the radiant energy with respect to a given solvent which is capable of dissolving the original material. It may also be a material, which is substantially insoluble in a given solvent, such as water, when it is applied to the form of a film or layer and becomes, upon the application of radiant energy soluble, or permeable, for example, in aqueous solutions. Further in this same connection, it is possible that a photosensitive material is soluble in an organic solvent, but insoluble in water. It may, therefore, be applied in the form of a solution in the organic solvent, which is thereafter evaporated to form a dry film or layer. After application of the radiant energy, the portions of the photosensitive material which have been subjected to the radiant energy may become soluble, or permeable, with respect to water, or an aqueous solution, by a physical change of the material or by a chemical reaction taking place under the effects of the radiant energy. In this case, the portions of the material which have been subjected to the radiant energy are dissolved, or permeated, when, for example, an aqueous solvent solution is applied, while the portions of the material, having remained in the original state, are not dissolved in, or permeated by, the aqueous solvent even though the material is soluble in an organic solvent.

The photosensitive material may be inorganic, organic or organometallic. Generally speaking, it is advantageous to use an organic salt because of the greater choice in materials, the possibility of adapting the solubility or permeability characteristics thereof to the solvent requirements for a selected image forming material, and the possibility of adapting the radiant energy sensitivity thereof to a given situation. The photosensitive material may be negative working or positive working.

In utilizing a negative working invisible light sensitive material in the preparation of the preferred microfilm structure, the generally optimum objectives of the preferred microfilm structure are attained with certain diazo compounds, especially the high molecular weight condensation products of these nitrogen compounds. Examples thereof are the water soluble high molecular weight condensation products obtained by condensation of diazotized diphenylamine type compounds with formaldehyde or other similar condensation agents. These compounds are water soluble, or water permeable, and give off, under the effect of electromagnetic radiation, nitrogen to form a bakelite-like, substantially water insoluble, or water impermeable resinous product. These compounds comprise high molecular weight diazonium salts in which the single molecules of the diazo compound are connected by methylene bridges or similar organic bridges. Typical examples of such compounds are 1-diazo-2,5-dimethoxybenzene, 1-diazo-2,5-diethoxybenzene, p-dimethylaminobenzene diazonium chloride, p-ethylaminobenzene diazonium chloride, p-diethoxyaminobenzene diazonium chloride, p-diazo-o-chloro-N-diethylaniline zinc chloride, 4-diazo-(4'-toluyl) mercapto-2,5-diethoxybenzene zinc chloride.

Other negative working energy sensitive materials which can be used include the materials comprising polymerizable monomers, especially unsaturated monomers, in combination with energy activatable, and especially actinic radiation activatable catalyst systems. Also useful as negative working invisible light sensitive materials are various azido compounds and paraquinone diazides.

Various negative working invisible light sensitive materials useful in the preferred microfilm structure are available commercially. Thus, for example, the high molecular weight, water soluble condensation product of a diazo compound sold under the designation "Diazo Resin No. 4" (Fairmount Chemical Company) is especially suitable. In addition, the photopolymers sold under the trademark "Redi-Cote" (Lithoplate Inc.), "Riston" (disclosed in U.S. Pat. No. 3,469,982), "Lydel" and "Dycril" (E.I. DuPont de Nemours), "Letterflex" (Grace), "Photozoid" (Upjohn), and other can be used.

The positive working energy sensitive materials which may be used in the preparation of the preferred microfilm structure like the negative working materials, can be selected from a wide group. Exemplary of such a material is a formaldehyde polymer of an o-quinone-diazide sulfonate containing a phenol coupler. Materials of this type are disclosed, for instance, in U.S. Pat. Nos. 3,210,239 and 3,639,185. Yet another example of a positive working material is the water insoluble polymers which become soluble upon the application of energy are o-quinone diazides. These polymers undergo photorearrangement to form base-soluble indene carbodylic acid. An o-quinone diazide product particularly suitable is sold commercially under the designation "AZ-1350" (Shipley). As previously indicated, positive working materials have the advantage in the practice of the present invention that only the exposed portions thereof are soluble in the processing thereof so unexposed portions thereof can be subsequently used to add recorded information.

Another important consideration is, as stated, that the photosensitive material and the image forming material are selected such that they are mutually compatible. Diazonium salts and other photosensitive nitrogen compounds of the diazo or azido type oftentimes react with a metal, or metallike layer, when they are deposited thereon, to become ineffective and destroyed after a short time. Tellurium, the tellurium compositions, and the other image forming materials used in the image forming layer usually do not have this effect and the preferred microfilm structures, therefore, have a long shelf life, maintaining their effectiveness and operativeness over long periods of time. With other image forming materials one will select from the large number of possible photosensitive materials those which are not, or only slightly, affected by the image forming material and which do not, or only slightly, react with each other.

As with the image forming materials, only an extremely thin film or layer of the energy sensitive material is needed. Basically, the film or layer need be only thick enough to form a coherent or continuous surface of the photosensitive material. No excessive material is needed because the material does not serve as a photoresist requiring a harsh etching agent, for instance, fuming acids for development. Furthermore, the photosensitive material is not needed for image formation. With most photosensitive materials useful in the preparation of the structure of the invention, the thickness of the layer containing the material may be from about 0.1 micron to about 5 microns, especially exceptional desirably about 0.2 to about 0.6 micron.

As is readily apparent from the foregoing, structures containing the effective materials in such thin layers contain very little material and are therefore low in cost. Another advantage is that these thin layers can be dissolved or developed in extremely short times as will be set out hereinafter.

The energy sensitive materials of the invention can be applied in the form of a solution by any of various known practices, including roller coating, spraying, spinning, dipping and the like. These methods, especially roller coating, also with those energy sensitive materials, which can be applied in the form of an aqueous solution such as the above mentioned formaldehyde condensation products of diazonium salts.

The substrates which can be used in the fabrication of the structure of the present invention advantageously are flexible films which are transparent. Exemplary of such films are transparentized paper, cellulose acetates, glassine paper, polyethylene, polypropylene, polyethylene glycol terephthalate (Mylar), polycarbonates, polyvinyl chloride, polyamides such as nylon, polystyrene, polymethyl -chloroacrylate, polyacrylonitrile and the like. For the production of visually detectable microfilm images, the desired image forming characteristic of an image forming material is opacity in the case of transmissive viewing, or reflectivity in the case of reflection viewing. For highest contrast one will select, in the case of transmissive viewing or projection, a transparent or translucent substrate such as one of the aforementioned plastic films. In the case of reflection viewing one will select a reflective substrate such as light colored paper, cardboard, plastic and the like. By the proper choice of substrate characteristics and image forming characteristics of the image forming material, one can produce images of highest contrast and distinction. The thickness of the flexible films employed as the substrate is variable. Generally speaking, in the case of plastic films the thickness can range from about 1 mil to 10 mils, or more. In these instances where an image is to be formed on both sides of the substrate in accordance with the double-imaging aspects of the invention, film thickness in the range of from about 5 mils to about 7, or 8 mils, are preferred.

The energy which may be used for imaging and for altering the solubility, or permeability, properties of the energy sensitive material may be selected in accordance with the requirement of the energy sensitive material used in each individual case. Preferred are those materials, which image upon the application of low or medium amounts of electromagnetic radiation, such as UV light or infrared radiation. Some of the preferred energy sensitive materials, such as the above mentioned high molecular weight diazonium type condensation products, can be changed by very short pulses of high intensity light sources, giving off UV radiation such as mercury vapor lamps, photographic flashs lamps and electronic flash lamps such as Xenon flashs lamps. With these types of high energy sources, flashes of less than ¼ second, and in the case of electronic flash lamps, pulses of the order of 1 or 2 milliseconds, are sufficient to bring about the change in the solubility characteristics of the energy sensitive material. The imaging by the short pulses is of particular benefit in the large scale production of microform.

As stated, a single solvent system advantageously is utilized in the development of the exposed structure of the present invention. Apart from its capabilities for dissolving, or permeating, the soluble, or permeable energy sensitive material, and for dissolving the image forming material after exposure, the solvent, generally speaking, will be selected on the basis of the development latitude afforded by it, and whether the exposed or unexposed areas of the structure are to be acted upon by the solvent. In those instances where the unexposed areas of the structure are to be acted upon by the solvent, the solvent desirably comprises a dilute aqueous solution of an alkali metal oxidizing agent exemplified by sodium hypochlorite, lithium hyprochlorite, potassium hypochlorite and the like. Such solutions not only have a high capacity for dissolving, or permeating, unexposed portions of the energy sensitive material following exposure, but, also, have a high capacity for dissolving the image forming material especially when the latter comprises tellurium or a tellurium containing material. In this latter connection, it is surprising and unexpected that an aqueous sodium hypochlorite solvent dissolves tellurium when deposited in the form of a thin film or layer as contemplated herein. An aqueous sodium hypochlorite solution generally does not dissolve tellurium in the form of granules or small particles. On the other hand, the said solvent readily dissolves tellurium if it is deposited in the form of a thin film or layer. The tellurium is soluble in the aqueous sodium hypochlorite solution regardless of whether it is deposited by vapor vacuum, or by sputtering techniques.

A further advantage of the aforementioned aqueous solvents resides in the fact that their solvent capacity extends over a wide range of concentrations. Thus, for example, the full strength aqueous sodium hypochlorite solution obtained as a reagent from Baker Chemicals Company and having a concentration of 6.9 percent, by weight, is an excellent solvent for the deposited layer of tellurium. The same reagent diluted to, for instance, 10 percent or even 1 percent of its strength is still a good solvent for the deposited thin tellurium layers. Such solvents have the added advantage of being unobnoxious, non-volatile and of affording large development latitude in that development, for example, of the exposed structure, in the case where the energy sensitive material is a diazo compound of the type sold under the designation Diazo Resin No. 4, can take place therein at rates varying from 1 foot per minute to 100 feet per minute without adverse affect on the finished microform. Further, in this same connection, a single quart of the solution is capable of processing as much as one thousand square feet of exposed imaging material. The rise of such a solution has the further important advantage of not requiring a skilled operator, or expensive and complicated processing equipment. The development latitude of aqueous solvents such as sodium hypochlorite and lithium hypochlorite can be enhanced by adding a suitable buffering agent to the solvent. Typical of such buffering agents are sodium and potassium bicarbonate.

Other oxidizing agent types of solvents include aqueous hydrogen peroxide, and aqueous solutions of potassium chlorate, and of ferric chloride. Hydrogen peroxide, like the hypochlorites, dissolves the unexposed areas of the imaging material. Potassium chlorate, by proper control of pH, can be employed to dissolve either exposed or non-exposed areas. More specifically, in this connection, at a pH of the order of 7 to 9, the exposed areas can be removed. At a higher pH in the range of about 11 to about 13, the unexposed areas can be removed. Ferric chloride acts on exposed areas only. Other solvent systems which can be used, but which, for one reason or other are not preferred, are aqueous iodine-potassium iodide solutions; iodine-potassium iodide in acetone; and iodine vapors in the presence of water vapor.

The following examples are illustrative of specific embodiments of the etchant responsive microfilm described.

EXAMPLE 1

A solution containing 8 weight percent Diazo Resin No. 4 is roller coated onto a substrate having a vacuum deposited film of tellurium, 1200 Angstroms thick, on one side thereof. The resin layer is 0.2 micron thick. The structure is exposed for 1 second using Microscan A-9 exposure units. The exposed structure is sprayed with 25 volume % NaOCl and 0.5 weight % sodium bicarbonate in water. Those areas of the Diazo Resin No. 4 layer which are not exposed, and the areas of the tellurium film underlying the unexposed areas of the resin layer, are simultaneously etched in about 1 second. The exposed areas are unaffected. After rinsing and drying a high quality reverse polarity duplicate is obtained.

EXAMPLE 2

The structure of Example 1 is exposed as described in the example. The structure is then sprayed with a solution comprising 5 weight % $NaClO_3$ and 2 weight % citric acid in water. The unexposed areas of the resin, including the underlying tellurium areas, are simultaneously dissolved in less than 3 seconds. The imaged structure is rinsed and dried to provide a high quality reverse polarity duplicate.

While the processing unit may take a variety of forms, as shown in FIG. 7 it includes a rectangular, open top housing 110 divided by transverse walls 112 and 114 into an etchant reservoir 116, a rinse reservoir 118 and a drying chamber 120. A microfilm passage assembly is carried on a frame 121 which rests on the top of the housing 110. Extending across the etchant reservoir 116 is an etching chamber-forming unit 123 supported on ribs 132 projecting inwardly from the frame 121. Extending across rinse reservoir 118 is a rinsing chamber-forming unit 125 supported on ribs 124 projecting inwardly from the frame 121. The etching chamber-forming unit 123 comprises a rectangular box-like structure having a top panel 128 with spaced rows of perforations 130. The perforations are staggered diagonally to ensure coverage of the entire surface of a print by developer solution sprayed through the perforations. Spaced above the top panel 128 is a guide plate 136 which forms a guide channel 134 for the microfilm 6. On the underside of guide plate 136 are diagonally disposed ribs 137 to minimize contact area with the top surface of the microfilm.

In the etchant reservoir 116 is a pump 139 immersed in the etchant solution 141 the pump having a vertical outlet 138. The bottom of the etching chamber-forming unit 123 has an opening 140 which seats over pump outlet 138 against a seal 142 so that the pump feeds directly into the etching chamber-forming unit.

The rinsing chamber-forming unit 125 is a box-like structure having upper and lower chamber-forming portions separated by spaced upper and lower guide walls 144–146 which form a guide channel 150 for the microfilm 6. The guide walls 144–146 have rows of diagonally staggered perforations 151–152. The upper and lower chamber-forming portions of the rinsing chamber-forming unit are interconnected by passageways (not shown) at the sides thereof.

In the rinse reservoir 118 is a pump 154 immersed in the rinse solution, the pump having a vertical outlet 156. The bottom wall of the lower chamber-forming portion of the rinsing chamberforming unit 125 has an opening 157 which seats over outlet 156 on a seal 158. Pump 154 floods the upper and lower chamber-forming portions of the rinsing chamber-forming unit 125 with rinse solution under pressure which solution is sprayed into the guide channels 150 through the perforations 151 and 152.

The etching chamber-forming unit 123 and the rinsing chamber-forming unit 125 are supported so that their guide channels 134 and 150 are horizontally aligned with an entry slot 160 in housing end wall 164 and an exit slot 166 in the housing end wall 168. In the drying chamber 120 are upper and lower air ducts 170 and 172. Each air duct conducts air flow in the general direction of microfilm motion in advance of the exit slot 166. The exit slot has considerable vertical depth to provide unresstricted air flow, the microfilm being effectively floated between the ducts and rapidly dried on both sides. Drying air is supplied to the ducts from any suitable blower.

The roll of microfilm 6 is driven through the processing unit by various pairs of rollers each including a driven lower roller and a freely rotatable upper roller with their tangential contact in horizontal alignment with guide channels 134 and 150. Two pairs of rollers 174–176 and 178–180 are mounted on opposite ends of etching chamber 116, two pairs of rollers 182–184 and 186–188 are mounted on opposite sides of rinsing chamber 125 and one pair of rollers 190–192 are mounted just inside end wall 168 at exit slot 166. The pairs of rollers 174–179 and 182–184 at the entry ends of the etching and rinsing chambers may be of the open interrupted type while the pairs of rollers 178–180 and 182–188 at the exit ends of the etching and rinsing chambers are resilient squeegee type to remove excess liquid from the microfilm. The pair of rollers 190–192 adjacent exit slot 166 is the open interrupted type for unrestricted air exhaust.

In passing through the etching chamber-forming unit 123, the light sensitive layer of microfilm 6 is on the bottom thereof and is sprayed on the bottom exposed face thereof with the etching solution. In the rinsing chamber-forming unit 125, the microfilm is rinsed from both sides and then dried from both sides in the drying chamber 120. Most of the sprayed liquid is removed after each wetting stage by the squeegee rollers 178–180 and 186–188, thus reducing contamination and speeding drying. The passage of a microfilm frame through the processing unit requires only a few seconds.

The processing unit just described is the subject of pending U.S. application Ser. No. 250,874 filed May 8, 1972 on Print Processing Unit.

As previously indicated, the processing of each exposed frame of the microfilm may take place in the interim between successive exposures thereof rather than as a completely separate operation after the entire roll of film has been exposed as in the case of the embodiment of the invention shown in FIG. 1. Accordingly, reference should be made to FIGS. 8 and 9 which illustrate this alternate form of the invention, which has its greatest practicality in microform reductions of much less magnitude than about 20 (where with the very small size of the film focused image and the small spacing usually desired between successive exposed portions of the film make it more difficult to apply the form of processing apparatus now to be described and shown in FIGS. 8 and 9). However, it is contemplated that the form of the processing apparatus now to be described can also be applied to microform reductions of the order of magnitude of 20 to 1 and greater.

As illustrated in FIGS. 8 and 9, a processing unit 75' is provided which is mounted for horizontal transverse reciprocating movement as well as up and down movement upon various support means to be described at a point next to the point where film 6' receives its exposure to invisible light. In FIG. 8, the reducing lens 43' is shown which focuses the image involved upon the film 6', between points where the film is supported by spaced pairs of rollers 200–200' and 202–202'.

The film processing unit 75' is shown supported horizontally for transverse sliding movement on a platform 204 in turn mounted for up and down movement of a support member 207 beneath the microform film 6' in a direction transverse to the length thereof. The platform 204 is reciprocated by any suitable motion imparting means 206, in turn, controlled by the sequence and function control means 18' which, during a processing operation, moves in sequence etchant spray means 75a', a rinse spray means 75b' and drying means 75c' beneath the just previously exposed frame of the film 6'. The etchant spray means 75' sprays the desired etchant upwardly through an opening 208 defined by upwardly projecting rubber-like seal-forming walls 210 of a size corresponding to the outlines of each exposed film frame and which are movable into liquid sealing relationship with the downwardly facing photosensitive layer of the film 6'. The rinse spray means 75b' applies an upwardly directed spray of the rinsing solution through an opening 212 defined by upwardly extending seal-forming walls 214 of a size corresponding to the outlines of each exposed film frame and which are movable into liquid sealing relationship with the downwardly facing invisible light sensing layer of the film 6'. The drying means 75c' directs an upward blast of warm air through an opening 216 defined by sealforming walls 218 of a size corresponding to the outlines of each exposed film frame and which are movable into liquid sealing relationship with the downwardly facing photosensitive layer of the film 6'.

The film 6' passes beneath a support plate 220 so that when the platform 204 carrying the film processing unit 75' is raised, the seal-forming walls 210, 214 or 218 in position beneath the exposed film frame are moved into liquid sealing relationship with the exposed film frame involved backed by the support plate 220, so that the etchant solution, the rinse solution or the warm air involved is confined to the bottom surface of the exposed film frame. The up and down movement of the platform 204 may be controlled in any suitable way, such as by means of an elevation control means 225 which may be a solenoid or the like which imparts upward and downward movement to the platform carrying support member 205. The elevation control means 225 may be controlled in any suitable way in the proper sequence by the sequence and function control means 18'.

After exposure of a frame of the film 6', motion imparting means 74 controlling the rotation of the take-up reel 10' on which the film 6' is wound operates to advance the film 6' one frame position, while the film processing unit 75' is at an elevation slightly below the plane of the film 6'. When the film advance operation is terminated, the elevation control means 225 raises the processing unit 75' to bring the seal forming walls 210 of the etchant spray means 75a' against the bottom of the film 6', where the pumping means forming a part thereof become operative to spray the etchant upwardly against the bottom surface of the film 6'. Much of the sprayed etchant will drain back into the etchant spray means 75a'. This operation takes from less than a second to at most a few seconds. The film processing unit 75' is then lowered slightly and advanced one station position by momentary operation of motion imparting means 206 to bring the rinse spray means 75b' into position below the exposed film frame, whereupon the elevation control means operates again to bring the rinse spray means sealing-forming walls 214 into sealing relation with the bottom of the film 6'. The pumping means associated with the rinse spray means 75b' is then energized to momentarily spray the rinse solution against the bottom surface of the film 6', much of the rinse solution draining back into the rinse spray means 75b'. After the film processing unit 75' is then lowered a small distance, motion imparting means 206 again is momentarily energized to move the drying means 75c' immediately below the exposed frame, whereupon the elevation control means raises the film processing unit 75' slightly to bring the seal forming walls 218 of the drying means against the bottom of the film 6'. The blowing and heating means of the drying means 75c' is then rendered operative to blow warm air against the bottom of the film 6', to remove any rinse solution which may still remain on the surface of the film 6'.

Since the processing of the film is not separately directly controlled by the user of the equipment, the control panel 16' associated with the form of the invention now being described need contain thereon only a manually operable "START" pushbutton 14' which initiates the combined exposure and developing cycle, a no film indicating light 72' which becomes energized to emit a red warning light when the roll of film leaves contact with the no film sensing means 70 positioned in front of the supply reel 8', and power ON and OFF pushbuttons 19' and 21' which serve the same function as the ON and OFF pushbuttons 19 and 21 previously described.

The nomenclature of the elements to be used in the claims to follow may, in some cases, differ from that used to describe corresponding elements of the microform producing systems previously described. However, the claim terminology is intended to cover embodiments shown in the drawings and equivalents thereof. For example, some of the claims refer to energy which does or does not efficiently differentially reflect off of the light and dark areas of printed documents and the like, which may or may not be the same as visible and invisible light in a given instance. Energy which does efficiently reflect off of the light and dark areas of a printed document is intended to cover, for example, the visible light generated on the face of a cathode ray tube which although not actually reflected from a printed document, is visible light nevertheless which can be so reflected. Also, some of the claims refer to an "image projection member" which has energy transparent and opaque areas. This member is intended to cover the transparent endless belt 29 or a transparent drum on which the image to be projected is xerographically or otherwise produced. Moreover, while the invention in its most advantageous form utilizes xerographic equipment to produce a projectable image on the image projection member, some of the claims more broadly refer to projection image producing means to cover both xerographic and other image reproduction means for producing a desirable image on the aforementioned image projection member.

It should be understood that numerous other modifications may be made in the preferred forms of the invention described and shown in the drawings without deviating from the broader aspects of the invention.

I claim:

1. In combination with xerographic apparatus including means for providing printed document differentially reflected light containing the information to be microfilmed and xerographic image producing means including an initially charged photoconductive surface in the path of said printed document differentially reflected light on which surface a pattern of uncharged areas is produced in response to the pattern of said energy impinging thereon, the improvement comprising apparatus for producing original microfilm on a microform film structure insensitive relative to silver halide films to energy which differentially reflects off of the light and dark areas of a printed document and relatively sensitive to ultraviolet light, said apparatus comprising: an image receiving member transparent to ultraviolet light; image developing means responsive to the pattern of charged areas on said photoconductive surface for providing on said image receiving member a coating of particles opaque to said ultraviolet light in a pattern corresponding to said charged areas on said photoconductive surface; a source of said ultraviolet light on one side of said coated image receiving member for projecting ultraviolet light through the transparent portion of said image receiving member; means for supporting said microfilm structure sensitive to said ultraviolet light in spaced relation to the other side of said image receiving member; image reduction lens means in the path of the ultraviolet light projected through said image receiving member for focusing on said microfilm structure an image reduced by a factor of at least about 20; first means for imparting motion intermittently to said image receiving member; second means for providing intermittent advancement of said microfilm structure on said supporting means in accordance with the spacing between successive exposure frames; a control station including a manually operable start means; sequence and function control means responsive to operation of said manually operable start means for initiating the momentary operation of said image producing means, first means which imparts motion to said image receiving member to move the image containing portion of said image receiving member to said image projection station, said source of ultraviolet light to project the image on said image projection member through said image reduction lens means and upon said microfilm structure, and said second means to impart advancement of said microfilm structure one frame position to bring an unexposed frame of said film into an exposure position.

2. The combination of claim 1 wherein said image receiving member is an endless member transparent to said ultraviolet light, said particles on said endless image receiving member being removable therefrom, and there is provided particle recovery means for removing said particles after the image produced thereby is projected on the microform film structure.

3. The combination of claim 1 further combined with a microform structure on said supporting means in spaced relation to said other side of said image receiving member, said microform structure includes a photosensitive layer responsive to said ultraviolet light and in the path of said ultraviolet light projected through said image receiving member, an opaque microform image-forming layer behind said energy sensitive layer which image-forming layer is etchable by a given etchant material which substantially permeates only one of the exposed and unexposed areas of said energy sensitive layer; and there is provided processing apparatus for applying said etchant to said microfilm structure to etch away the portions of said image-forming opaque layer behind the portions of said photosensitive layer permeated thereby.

4. The combination of claim 1 wherein the system further includes processing means for processing the exposed microform film structure to produce a completed microform ready for viewing on a microform film reader, and said motion and sequence control means including means for operating said processing means to process the exposed film structure.

5. An original microform system for producing original microform on a microform film structure relatively insensitive to energy which differentially reflects off of the light and dark areas of a printed document, said system comprising: an information input station for providing printed document differentially reflected energy containing the information to be microformed; projection image producing means including an image receiving member, said projection image producing means being responsive to said printed document differentially reflected energy directed from said information input station for forming on said image receiving member a pattern of areas respectively transparent and opaque to radiant energy to which said microform film structure is responsive; first means for imparting motion intermittently to said image receiving member; a source of said radiant energy positioned on one side of said image receiving member at an image projection station; a microform film structure in the form of a roll of film and unwindable from a supply reel and after exposure windable onto a take-up reel, said film being in spaced relation to the other side of said image receiving member and mounted for intermittent advancement in accordance with the spacing between successive exposure frames; second means for imparting an intermittent movement to said microform film structure; reducing lens means positioned between the other side of said image receiving member and an unwound portion of the film for focusing on the microform film structure a substantially reduced image of the image projected through said image receiving member; a control station including a manually operable start means for initiating a one film frame advancement of the film each exposure cycle; sequence and function control means responsive to operation of said manually operable start means for initiating operation of said manually operable start means for initiating operation of said projection image producing means including the momentary operation of said first means which imparts motion to said endless image projection member to move the image containing portion of said image receiving member to said image projection station for momentarily energizing said source of radiant energy to project the image on said image receiving member through said reducing lens means and upon said unwound portion of said film, and for momentarily operating said second means to impart advancement of said film one frame position to bring an unexposed frame of said film into an exposure position; processing means for processing the exposed microform film structure to produce a completed microform ready for viewing on a microform film reader, said motion and sequence control means including means for operating said processing means to process the exposed film structure; film sensing means for sensing completion of exposure of the roll of microform film; indicating means at the control station for indicating the end of the exposure of the complete roll of said microform; and means controlled by said function and sequence control means for feeding a completely exposed roll of film through said processing means to process the same.

6. The original microform producing system of claim 5 wherein there is provided processing means for processing exposed frames on said microform film structure to provide a microform film structure ready for viewing on a microform film reader or the like, said sequence and function control means being responsive to the operation of said manually operable start means for effecting during each exposure cycle the operation of said processing means to process the exposed frame of said microform film structure immediately after each exposure thereof.

7. The original microform producing system of claim 6 wherein said processing means directs a processing material upon the just exposed frame of the microform film structure and includes masking means for confining said processing material to the exposed frame of the microform film structure.

8. An original microform system for producing original microform on a microform film structure relatively insensitive to energy which differentially reflects off of the light and dark areas of a printed document, said system comprising: an information input station for providing printed document differentially reflected energy containing the information to be microformed; projection image producing means including an image receiving member, said projection image producing means being responsive to said printed document differentially reflected energy directed from said information input station for forming on said image projection member a pattern of areas respectively transparent and opaque to radiant energy to which said microform film structure is responsive, said image receiving member being an endless member; first means for imparting motion intermittently to said endless image receiving member; a source of said radiant energy positioned on one side of said image receiving member at an image projection station; a microform film structure supported for intermittent advancement in accordance with the spacing between successive exposure frames, said microform film structure being supported in spaced relation to the other side of said image receiving member; second means for imparting an intermittent movement to said microform film structure; reducing lens means positioned between the other side of said image receiving member and said microform film structure for focusing on the microform film structure a substantially reduced image of the image projected through said image receiving member; a control station including a manually operable start means for initiating a one film frame advancement of the microform film structure each exposure cycle; sequence and function control means responsive to operation of said manually operable start means for initiating operation of said projection image producing means including the momentary operation of said first means which imparts motion to said endless image receiving member to move the image containing portion of said image projection member to said image projection station for momentarily energizing said source of radiant energy to project the image on said image projection member through said reducing lens means and upon said microform film structure, and for momentarily operating said second means to impart advancement of said microform film structure one frame position to bring an unexposed frame of said microform film structure into an exposure position; processing means for processing exposed frames on said microform film structure to provide a microform film structure ready for viewing on a microform film reader or the like, said sequence and function control means being responsive to the operation of said manually operable start means for effecting during each exposure cycle the operation of said processing means to process the exposed frame of said microform film structure immediately after each exposure thereof, said processing means having processing material discharge opening-forming means framed by seal-forming means for forming a seal about an exposed film frame and being mounted for movement from a position in spaced relation to the said microform film structure to an operative position, said sealforming means being forced into sealing relation with the just exposed frame of the microform film structure; means for imparting motion to said processing means between said positions, said motion imparting means being controlled by said sequence and function control means which effects the movement thereof from said spaced position to said operative position and the discharge of said processing material against the exposed face of the exposed film frame.

* * * * *